US010685648B2

(12) United States Patent
Andersen et al.

(10) Patent No.: US 10,685,648 B2
(45) Date of Patent: Jun. 16, 2020

(54) SENSOR FUSION MODEL TO ENHANCE MACHINE CONVERSATIONAL AWARENESS

(71) Applicant: International Business Machines Corporation, Armonk, NY (US)

(72) Inventors: John J. Andersen, Austin, TX (US); Dogukan Erenel, Round Rock, TX (US); Richard O. Lyle, Cedar Park, TX (US); Connie Yee, Flushing, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/806,438

(22) Filed: Nov. 8, 2017

(65) Prior Publication Data

US 2019/0139541 A1 May 9, 2019

(51) Int. Cl.
*G10L 15/22* (2006.01)
*G10L 15/06* (2013.01)
*G06F 3/01* (2006.01)
*G10L 15/16* (2006.01)
*G10L 15/24* (2013.01)
(Continued)

(52) U.S. Cl.
CPC .............. *G10L 15/22* (2013.01); *G06F 3/012* (2013.01); *G06F 3/167* (2013.01); *G06F 40/279* (2020.01); *G10L 15/063* (2013.01); *G10L 15/16* (2013.01); *G10L 15/1815* (2013.01); *G10L 15/24* (2013.01); *G10L 15/26* (2013.01);
(Continued)

(58) Field of Classification Search
CPC ......... G10L 15/22; G10L 15/24; G10L 15/26; G10L 2015/226
See application file for complete search history.

(56) References Cited

U.S. PATENT DOCUMENTS 8,275,803 B2  9/2012  Brown et al.
9,972,339 B1  5/2018  Sundaram
(Continued)

OTHER PUBLICATIONS

List of IBM Patents or Patent Applications Treated as Related, Nov. 8, 2017, 2 pages.
(Continued)

*Primary Examiner* — Richemond Dorvil
*Assistant Examiner* — Mark Villena
(74) *Attorney, Agent, or Firm* — Stephen J. Walder, Jr.; Feb R. Cabrasawan

(57) ABSTRACT

Mechanisms are provided, in a smart speaker system having at least one smart speaker device comprising an audio capture device, and smart speaker system logic, for processing audio sample data captured by the audio capture device. The audio capture device captures an audio sample from a monitored environment and one or more sensor devices capture sensor data representing non-verbal attention indicators associated with a speaker of a speech portion of the audio sample. The smart speaker system logic evaluates the non-verbal attention indicators of the sensor data to determine whether or not the speech portion of the audio sample is directed to the smart speaker device. In response to determining that the speech portion of the audio sample is directed to the smart speaker device, a cognitive system associated with the smart speaker system generates a response to the speech portion.

17 Claims, 5 Drawing Sheets

(51) Int. Cl.
*G10L 15/18* (2013.01)
*G10L 15/26* (2006.01)
*G10L 25/48* (2013.01)
*G06F 3/16* (2006.01)
*G06F 40/279* (2020.01)
*G10L 25/21* (2013.01)

(52) U.S. Cl.
CPC .............. *G10L 25/48* (2013.01); *G10L 25/21* (2013.01); *G10L 2015/223* (2013.01); *G10L 2015/227* (2013.01)

(56) References Cited

U.S. PATENT DOCUMENTS

| | | | |
|---|---|---|---|
| 2006/0293893 A1* | 12/2006 | Horvitz | G06F 17/289 704/251 |
| 2007/0011609 A1 | 1/2007 | Adjouadi et al. | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0365216 A1* | 12/2014 | Gruber | G10L 13/027 704/235 |
| 2015/0066479 A1 | 3/2015 | Pasupalak et al. | |
| 2015/0348548 A1* | 12/2015 | Piernot | G10L 15/26 704/235 |
| 2016/0026434 A1 | 1/2016 | Johnston et al. | |
| 2016/0071517 A1* | 3/2016 | Beaver | G06F 17/279 704/9 |
| 2016/0132290 A1 | 5/2016 | Raux | |
| 2017/0169817 A1 | 6/2017 | VanBlon et al. | |
| 2017/0169818 A1* | 6/2017 | VanBlon | G06F 3/013 |
| 2018/0358003 A1* | 12/2018 | Calle | G10L 21/02 |
| 2019/0005138 A1* | 1/2019 | Andreica | G06F 3/167 |
| 2019/0139541 A1 | 5/2019 | Andersen et al. | |

OTHER PUBLICATIONS

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Simpson, Andrew J. et al., "Deep Karaoke: Extracting Vocals from Musical Mixtures Using a Convolutional Deep Neural Network", Cornell University, arXiv: 1504.04658, Apr. 17, 2015, 5 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner

SENSOR FUSION MODEL TO ENHANCE MACHINE CONVERSATIONAL AWARENESS

BACKGROUND

The present application relates generally to an improved data processing apparatus and method and more specifically to mechanisms for providing a sensor fusion model to enhance machine conversational awareness.

Smart speaker technology has increased in capabilities and popularity over recent years. A smart speaker is a type of wireless speaker and smart device that utilizes Wi-Fi, Bluetooth or other communication standards, and provides features beyond audio playback. This can include features such as compatibility across a number of services and platforms, peer-to-peer connection through mesh networking, intelligent personal assistants, and the like. Each can have its own designated interface and features in-house, usually launched or controlled via an application or home automation software. Examples of smart speakers include Amazon Echo™, Google Home™, Apple Siri™ enable devices, Microsoft Cortana™ enabled devices, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a smart speaker system having at least one smart speaker device comprising an audio capture device, and smart speaker system logic for processing audio sample data captured by the audio capture device. The method comprises capturing, by the audio capture device of the smart speaker device, an audio sample from a monitored environment, and capturing, by one or more sensor devices, sensor data representing non-verbal attention indicators associated with a speaker of a speech portion of the audio sample. The method further comprises evaluating, by the smart speaker system logic, the non-verbal attention indicators of the sensor data to determine whether or not the speech portion of the audio sample is directed to the smart speaker device. In addition, the method comprises, in response to determining that the speech portion of the audio sample is directed to the smart speaker device, generating, by a cognitive system associated with the smart speaker system, a response to the speech portion.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
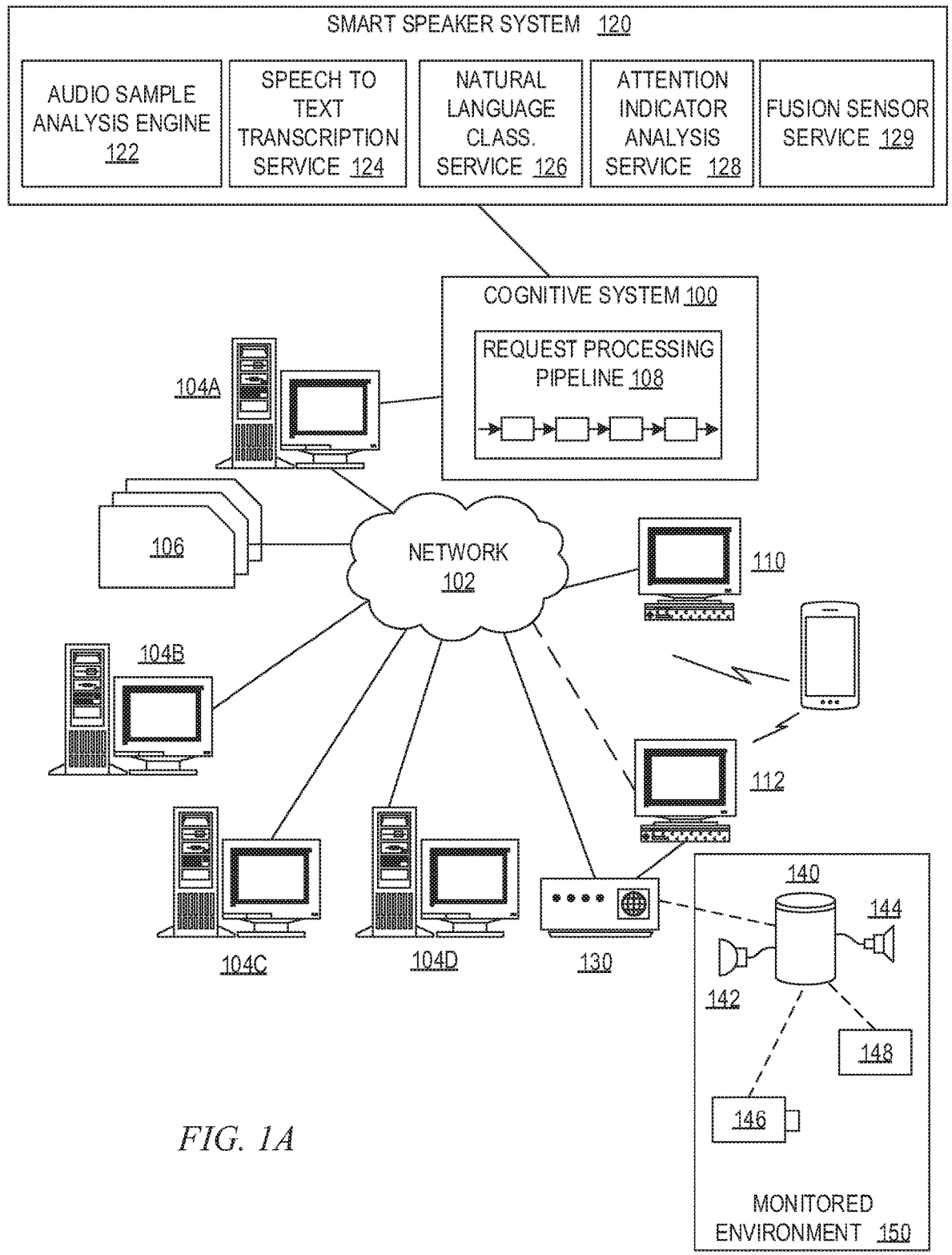
FIG. 1A depicts a schematic diagram of one illustrative embodiment of a smart speaker system in accordance with one illustrative embodiment.

The illustrative embodiments comprise mechanisms for providing a sensor fusion model for enhancing machine conversational awareness. As mentioned above, smart speaker technology has recently enjoyed increase popularity with the release of various smart speaker devices and services that make home automation and audio entertainment more accessible and user friendly. A defining characteristic of these known smart speaker devices is the need to have a fixed predefined wake word or phrase that the smart speaker must recognize in order to determine that it is to perform speech recognition on the spoken words of the user following the wake word or phrase. Examples of such fixed wake words or phrases include, for example, "Hey, Siri . . . " for the Apple Siri™ devices, "Cortana . . . " for the Microsoft Cortana devices, or "Alexa . . . " for the Amazon Echo™ devices.

Those who have used a smart speaker device know that these devices suffer from the cocktail party problem, which is a classic problem in Human Computer Interaction (HCI). The cocktail party problem refers to the difficulty in perceiving conversation appropriately in a noisy or crowded environment. This problem is typically addressed with HCI mechanisms by requiring the human to say a designated keyword or key phrase as discussed above so that the HCI mechanism, such as a smart speaker, knows that it is being addressed. While this is fairly effective, the drawback to this approach is that it does not allow for a genuine or natural conversation between a human and a computer. The system will only respond when directly addressed by the keyword or key phrase, and will ignore the rest of the conversation, no matter how important it may be. This limitation may be annoying to users at best, and may be a bottleneck to the entire HCI system at worst. In addition, many times the HCI mechanism, e.g., smart speaker, may erroneously identify other words/phrases as being the key word or key phrase and may respond incorrectly and at inappropriate times.

With the mechanisms of the illustrative embodiments, a fusion sensor mechanism is provided in association with the HCI mechanism to evaluate other attention indicators or cues, i.e. other non-verbal indicators or cues, to enhance a determination as to whether a user is directing a spoken input to a HCI mechanism (hereafter assumed to be a smart speaker for purposes of illustration). It should be appreciated that the HCI mechanism may be any audio based interactive application and device may be considered an HCI mechanism in the context of the present invention, e.g., any smart speaker, smart responder, smart dialog system, or the like. The smart speaker device may continuously collect audio input which may be processed locally by a local speech to text service, or streamed to a remotely located speech to text service, which generates transcriptions when probable speech is detected.

In response to the generated transcription, a local or remotely located natural language classification service may be employed to determine the best possible response by classifying the natural language of the transcription. The fusion sensor mechanism may be utilized to augment the operation of the natural language classification by providing a determination as to whether a response by the smart speaker device is appropriate in terms of both timing and content.

As mentioned above, the fusion sensor may operate on a variety of different non-verbal attention indicators or cues which are used in combination with the natural language classification to determine whether the smart speaker device should respond to the detected speech. Some of the other non-verbal attention indicators, or cues, include sound energy, gaze detection (eye contact), head nod detection (agreement), person proximity (how far away a human speaker is from the smart speaker device), speech to text transcription confidence (how clearly the smart speaker device heard the statement/question). These different attention indicators or cues may be obtained through analysis of data obtained from a variety of different sensor mechanisms present within a monitored environment. For example, various types of audio sensors, video sensors, and/or proximity sensors may be provided in association with the fusion sensor mechanism, which itself may be associated with the smart speaker device, integrated into the smart speaker system, or the like. These audio sensors, video sensors, and/or proximity sensors may be integrated into the smart speaker device, may be distributed around the monitored environment, or a combination of both.

The fusion sensor mechanism uses deep learning for sensor fusion to consolidate important features from the variety of different sensor mechanisms to perform conversational awareness determinations. The deep learning, in one illustrative embodiment, may be achieved using a feed-forward, fully-connected neural network that allows for a single consolidated decision as to whether the HCI mechanism (smart speaker device) should respond to a user's spoken input or not. Each relevant feature is fed into the neural network as an input to calculate a single output metric corresponding to the likelihood that the system should respond. The neural network model is created by providing a neural network model architecture which is then submitted to training by running the neural network in a training mode using a setting that is similar to the eventual live environment of the system. In this training mode, the system operates normally up to the point of attention classification, when instead of initiating additional functionality of a smart speaker device, the neural network outputs all of the output values generated based on the various relevant feature inputs. This essentially generates an unlabeled sample which is collected, reviewed, and labeled based on an audio or video recording of the training session. A human reviewer will then mark the outputs of the output nodes as to whether the smart speaker system should respond or not based on the evaluation of the corresponding input relevant feature. This information is fed back into the neural network so as to train the neural network by modifying weights between nodes such that the neural network generates correct outputs at the output nodes.

In operation after training, a merge output node may be utilized to combine the outputs of the output nodes for the various input relevant features to generate a single indication of whether or not the smart speaker device should respond to a spoken input. In some embodiments, the merge output node may also be trained in a similar manner to that of the other output nodes so as to modify any weights, if any, between the various output nodes associated with the different input relevant features.

In one illustrative embodiment, the neural network is trained to operate on a plurality of input relevant features that are obtained through analysis of audio, video, and/or proximity sensor data obtained from the variety of sensor mechanisms associated with the fusion sensor mechanism. Examples of relevant features include normalized sound energy level, gaze detection stability, normalized person proximity, speech to text transcription confidence, and intent classification confidence. Other relevant features that may be included in some illustrative embodiments include tone analysis features from audio/text, object classification features from image recognition, or any other sensory input that may be used to increase response quality in accordance with the desired implementation.

Normalized sound energy level is a quantified representation of the amount of sound in the captured audio believed to be directed to the smart speaker device. This energy level is normalized between the minimum and maximum values recorded within a certain recent time window. The gaze detection stability is the ratio of time that a speaker makes eye contact with the smart speaker device over a total duration of a recent time window. The normalized person proximity is the nearest detected person normalized to within a reasonable speaker range, e.g., 0.25 to 3 m.

The speech to text transcription confidence is an estimation that the transcription performed by a speech to text transcription service associated with the smart speaker device is correct. In one illustrative embodiment, the confidence score ranges from 0 to 1.0, where a score of 1.0 indicates that the transcription reflects the most likely result based on the acoustic evidence, while a score of 0.5 means that the word has a 50% chance of being correct.

The intent classification confidence is an estimation that the classification performed by a natural language classification service is correct. Again, in one illustrative embodiment, the intent classification confidence may range from 0 to 1.0 and the confidence levels for all the classes given in the training data sum to 1.0.

The illustrative embodiments evaluate one or more of these non-verbal attention indicators or cues to attempt to approximate the ability of a human being to subconsciously interpret signals and their higher order relationships during a conversation, but within a machine implemented mechanism that does not have the innate ability to interpret such indicators or cues. The result is a more accurate determination by the smart speaker device as to whether a human speaker is directing their speech to the smart speaker device, even within a crowded conversation environment, such as in the cocktail party problem discussed above. Thus, the smart speaker device, or other HCI mechanism, does not require a key word or key phrase to be spoken in order for the smart speaker device or HCI mechanism to appropriate respond to speech directed at the smart speaker device or HCI mechanism. This allows for a more natural and comfortable conversation type interaction between a human user and the smart speaker device or HCI mechanism. Moreover, the mechanisms of the illustrative embodiments reduce instances where the smart speaker device or HCI mechanism erroneously identifies a speech input as having the key word or key phrase for waking the device, i.e. a wake word/phrase, by evaluating other attention indicators or cues that may indicate that the speaker is not speaking to the smart speaker device or HCI mechanism.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides a fusion sensor service for use with a smart speaker system/device or other human computer interaction (HCI) mechanism, which for purposes of illustration herein will be assumed to be a smart speaker system but instead, without departing from the spirit and scope of the present invention, may be other types of HCI mechanisms that respond to audio input from a user. The fusion sensor service augments the smart speaker system/device logic for determining whether to respond to a captured audio sample by utilizing a cognitive evaluation of one or more non-verbal attention indicators or cues to determine if these one or more non-verbal attention indicators indicate that a source of speech in the audio sample is directing the speech to the smart speaker system/device or not. Thus, the fusion sensor service assists the smart speaker system/device in determining whether to respond to speech in a captured audio sample or not based on non-verbal attention indicators.

The smart speaker system may be completely provided within a stand alone smart speaker device or may be distributed over multiple devices that may communicate via one or more data networks. For example, a smart speaker device may be provided that includes software logic for implementing the various components of a smart speaker system in accordance with the illustrative embodiments. Such a stand-alone smart speaker system may access remotely located data processing systems for information retrieval purposes, but otherwise the functionality of the illustrative embodiments may be provided within the stand alone smart speaker device. In other illustrative embodiments, the smart speaker system may comprise a smart speaker device that performs a first subset of the functionality described herein with regard to various ones of the illustrative embodiments, while other subsets of the functionality may be provided by one or more other data processing systems, cloud based systems, or the like.

The illustrative embodiments may be utilized in many different types of data processing environments. In order to provide a context for the description of the specific elements and functionality of the illustrative embodiments, FIGS. 1A-3 are provided hereafter as example environments in which aspects of the illustrative embodiments may be implemented. It should be appreciated that FIGS. 1A-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1A-3 are directed to describing various aspects of an example smart speaker system comprising logic for identifying speech within captured audio samples, determining whether the speech is directed to the smart speaker device present within a monitored environment, and responding accordingly to the content of the speech when it is determined that the speech is directed to the smart speaker device. In accordance with the illustrative embodiments set forth herein, the smart speaker system is augmented to include a fusion sensor service that assists with determining whether the speech in a captured audio sample is directed to the smart speaker device or not so as to initiate the generation of an appropriate response by the smart speaker system to the source of the speech. The fusion sensor service provides a cognitive evaluation of one or more non-verbal attention indicators to determine whether or not the speech is directed to the smart speaker device in the monitored environment and thus, whether the smart speaker device should respond to the speech or not.

The example shown in FIGS. 1A-3 assumes a distributed data processing system environment for purposes of illustration, however as noted above, the smart speaker system may be implemented in a stand alone device that is configured with the logic and computing hardware for implementing the various engines and services of the smart speaker services of the illustrative embodiments. Moreover, the example shown in FIGS. 1A-3 utilizes a cognitive system for performing natural language processing, classification, and response generation. The mechanisms of the illustrative embodiments may assist the cognitive system by determining when to perform such natural language processing, classification, and response generation and when not to perform such operations. In some implementations or embodiments, the cognitive system itself may provide the fusion sensor service functionality by providing various algorithms and the like to process different sensor input data in the manner described hereafter, to perform a joint analysis of the various sensor input to determine whether or not speech in a captured audio sample is directed to the smart speaker device.

The cognitive system implements a request processing pipeline, request processing methodology, and request processing computer program product with which the mechanisms of the illustrative embodiments may be implemented. These requests may be provided as structure or unstructured data, request messages, natural language questions, or any other suitable format for requesting an operation to be performed by the cognitive system and may be extracted from audio samples captured by audio capture devices, e.g., microphones, associated with smart speaker devices, such as via any known or later developed speech recognition computing logic/hardware.

One type of request processing pipeline with which the mechanisms of the illustrative embodiments may be utilized is a Question Answering (QA) pipeline. With such a QA pipeline, a user may provide an input question, such as via a spoken question that is captured by the audio capture devices of the smart speaker device, which is then parsed and analyzed to determine what the question is asking, and then perform a search of available information from one or more corpora to ascertain candidate responses to the input question, rank them according to evidential support, and then select a final response to be provided back to the user. It should be appreciated that while the present invention may include such a QA pipeline in the context of the cognitive system, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What is the weather forecast for today?", the cognitive system may instead receive a request of "Tell me the weather forecast for today" or the like. It should be appreciated that the mechanisms of the QA system pipeline may operate on requests in a similar manner to that of input natural language questions with minor modifications.

As the illustrative embodiments may employ a cognitive system pipeline to process requests or natural language questions present in captured audio samples so as to generate an appropriate response, and/or analyze data from one or more sensors providing data indicative of non-verbal attention indicators or cues to determine whether speech in captured audio samples is directed to the smart speaker device, it is important to first have an understanding of how cognitive systems operate. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition.

A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like. In the context of the illustrative embodiments set forth herein, the logic of the cognitive system implements cognitive operations for autonomously recognizing different types of sounds as wake sounds, analyzing various sounds to categorize them, determine patterns of sounds, cognitively analyze such patterns to identify events occurring within a monitored environment, and automatically cognitively determine appropriate feedback or responsive actions to be performed in response to identification of such events.

IBM Watson™ is an example of a cognitive system which may be modified and augmented to perform the cognitive operations of the illustrative embodiments. The IBM Watson™ cognitive system can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems, or processing and responding to requests input to these cognitive systems, using a request processing pipeline to process requests which may or may not be posed as natural language questions or may be provided simply as input data for processing.

In accordance with the illustrative embodiments, the request processing pipeline is an artificial intelligence application executing on data processing hardware that processes input data, which may be captured audio data from a smart speaker device, for example, which may be provided itself or in combination with a natural language question posed by a user to the smart speaker device. The request processing pipeline receives inputs from various sources including input from other data processing systems over a network, one or more corpora of electronic documents, information from audio (sound) sample archives, knowledge information sources, or other data. Data storage devices or systems store the corpora of data and may be accessible via the data network(s). The data in the corpora may include any file, electronic textual document, article, or source of data for use in the cognitive system. In particular with some of the illustrative embodiments, the corpora may include information, rules, logic, or the like, for evaluating non-verbal indicators or cues in sensor data for determining a likelihood that the attention of a source of speech in captured audio sample data is directed to a smart speaker device (or other HCI mechanism). Alternatively, in other illustrative embodiments, such rules, logic, etc. are implemented in a separate fusion sensor service, which may include other artificial intelligence constructs, such as a neural network or the like, which are configured to perform such cognitive evaluation of non-verbal indicators or cues. In such embodiments, the cognitive system request processing pipeline may be utilized to generate appropriate response to speech based requests/questions in response to the fusion sensor service indicating that the speech is directed to the smart speaker device.

With regard to speech input, the request processing pipeline receives an input question or request, parses the question/request to extract the major features, uses the extracted features to formulate queries, and then applies those queries to the corpus of data. Based on the application of the queries to the corpus of data, the request processing pipeline generates a set of hypotheses, or candidate responses to the input question/request, by looking across the corpus of data for portions of the corpus of data that have some potential for containing a valuable response to the input question/request. The request processing pipeline then performs deep analysis on the content, features, and the like, of the input question/request as well as the content, features, and the like, used in each of the portions of the corpus of data found during the application of the queries, using a variety of reasoning algorithms. There may be hundreds or even thousands of reasoning algorithms applied, each of which performs different analysis, e.g., comparisons, calculations and analysis, and the like, and generates a confidence score indicating a confidence in the candidate response being a correct response for the input question/request. For example, some reasoning algorithms may look at the matching of terms and synonyms within the language of the input question and the found portions of the corpus of data. In some illustrative embodiments, the reasoning algorithms may look to the non-verbal attention indicators and cues and analyze this data from one or more sensors in the monitored environment to make determinations as to the likelihood that the speaker of a portion of speech in a captured audio sample is directing the speech to the smart speaker device present in the monitored environment.

With regard to processing natural language requests/questions, the scores obtained from the various reasoning algorithms indicate the extent to which the potential response is inferred by the input question/request based on the specific area of focus of that reasoning algorithm. Each resulting score is then weighted against a statistical model. The statistical model captures how well the reasoning algorithm performed at establishing the inference between the input question/request and the candidate answer/response. The statistical model is used to summarize a level of confidence that the request processing pipeline has regarding the evidence that the potential response, i.e. candidate answer/response, is inferred by the question/request. This process is repeated for each of the candidate answers/responses until the request processing pipeline identifies candidate answers/responses that surface as being significantly stronger than others and thus, generates a final answer/response, or ranked set of answers/responses, for the input question/request.

FIG. 1A depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions or requests which may be extracted from captured audio samples obtained by a smart speaker device 140, or other HCI mechanism, deployed in association with a monitored environment 150. That is, an audio sample may be captured by audio capture device(s) 142, e.g., microphones, associated with the smart speaker device 140, from the monitored environment 150 and may be analyzed to determine whether the audio sample contains speech. In response to the audio sample containing speech, the speech may be converted to a natural language or structured request/question by a speech to text transcription service and the resulting natural language or structured request/question may be provided to the request processing pipeline 108 for processing. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102.

For purposes of illustration only, FIG. 1A depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112 and/or via the smart speaker device 140 deployed in the monitored environment 150. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, subsystems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, input data (such as audio sample data or the like), etc. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1A for illustrative purposes only). Portions of the corpus or corpora of data 106 may also be provided on one or more other network attached storage devices, in one or more databases, or other computing devices not explicitly shown in FIG. 1A. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language and are associated with input data that is to be processed in accordance with those questions/requests or are applied to already collected data. The cognitive system 100 parses and interprets the input question/request and/or input data via a pipeline 108, and provides a response containing one or more answers to the question posed, response to the request, results of processing the request and input data, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses. In some illustrative embodiments, the final answer/response is in the form of the performance of a responsive action which may include, for example, local audible/visual message/request output actions, remote communication actions, and local device control actions.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer/response is inferred by the question/request. This process may be repeated for each of the candidate answers/responses to generate ranked listing of candidate answers/responses which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

The cognitive system 100 may be part of the smart speaker system 120 or may operate in conjunction with a smart speaker system 120. For example, the smart speaker system 120 may be integrated into the cognitive system 100 where the request processing pipeline 108 may operate to perform elements of the functionality of the natural language classification service 126, for example, for purposes of classifying the natural language and generating an appropriate response. It should be appreciated that the natural language classification service performs classification of natural language which is a process for understanding the intent of the natural language, based on the training of the natural language classification service on a corpus. For example, the corpus may contain a set of examples of how one asks what the weather is. Thereafter, if a question is asked to the smart speaker of the type "Is rain in the forecast?" but does not exist in the training corpus, the natural language classification service 126 will still group the question with the training set of weather questions with a high confidence score. Thus, classification of natural language helps to understand if the query is related to a topic in scope or out of scope and what the intent of the natural language is.

As described hereafter, the fusion sensor service 129 of the smart speaker system 120 may, based on results of analyzing attention indicators, initiate the processing of natural language requests/questions in captured audio samples via the request processing pipeline 108 of the cognitive system 100, or temporarily disable the processing of such natural language requests/questions, such as when it is determined that the speakers attention is not directed to the smart speaker device 140.

The smart speaker system 120 is shown as a separate entity from the smart speaker device 140, which is present in the monitored environment 150, and is shown as being provided by a single server computing device 140 that is specifically configured to implement the cognitive system 100 and smart speaker system 120. However, the present invention is not limited to such a configuration. To the contrary, the smart speaker system 120 may be integrated into the smart speaker device 140 in some embodiments. In other embodiments, the smart speaker system 120 may be distributed across a plurality of server computing devices 104A-104D, such as in a cloud computing system or the like. Various components 122-129 of the smart speaker system 120 may be provided on different computing devices.

As shown in FIG. 1A, the smart speaker system 120 comprises an audio sample analysis engine 122, a speech to text transcription service 124, a natural language classification service 126, an attention indicator analysis service 128, and a fusion sensor service 129. The smart speaker system 120 operates in conjunction with one or more smart speaker devices 140 in the same or different monitored environments 150. The smart speaker devices 140 each comprise one or more audio capture devices 142, such as microphones, and one or more audio output devices 144, such as speakers. In addition, the smart speaker device 140 may comprise, or be in communication with, various sensor devices 146-148 which may include one or more video or image capture devices 146, e.g., video camera(s), one or more proximity detectors 148, and/or the like. The sensor devices 146-148 may be connected to the smart speaker device 140 via wired or wireless communication links and may be positioned within the monitored environment 150 in various distributed locations. The smart speaker device 140 may further comprise local processing capability to perform some initial processing of captured audio samples to render them as data, perform some local evaluation of audio samples with regard to whether the audio sample comprises speech components, outputting data as audio output and processing audible responses, and also process data for performing local control of enabled wireless devices.

While FIG. 1A shows the audio capture device(s) 142 being integrated with the smart speaker device 140, in some illustrative embodiments, a distributed array of audio capture devices, within or associated with the monitored environment 150, that are in multiple smart speaker devices or otherwise provided and able to communicate with the smart speaker device 140. In some embodiments, the audio capture devices may be part of a smart speaker device 140 that is mobile within the monitored environment 150, such as part of a robotic chassis whose movement is either automatically guided through the monitored environment or controlled remotely by a human operator. The audio capture devices 142 operate to capture audio data, e.g., data representing the waveform of sound captured from the monitored environment 150. The audio data (audio sample) may then be locally stored, such as in a buffer of the smart speaker device 140, and/or remotely stored and analyzed to identify the sounds present in the audio data. For example, the analysis of the audio data may comprise first determining, such as at a local level, whether the captured audio data represents one or more sounds that indicate human speech and if so, transmitting that captured audio data to the smart speaker system 120 for further processing. Alternatively, all captured audio may be converted locally to data that is transmitted across the network 102 to the smart speaker system 120 which then analyzes the audio data, via the audio sample analysis engine 122, to identify any human speech components of the audio data.

That is, the audio capture device(s) 142 of the smart speaker device 140 captures audio samples from the monitored environment 150 and may locally identify the audio samples containing speech components. For example, as noted above, the smart speaker device 140 or system 120 may continuously monitor the monitored environment 150 by capturing audio samples, forwarding the audio sample to the smart speaker system 120 for processing by the audio sample analysis engine 122, or processing the audio samples locally by a locally implemented audio sample analysis engine 122, to determine if they contain sound patterns that correspond to spoken words, such as may be done by a speech recognition mechanism.

For example, such analysis of captured audio samples may comprise performing pattern analysis, feature extraction (e.g., amplitude, frequency, duration, etc.), and the like. The patterns and/or features may be used as a basis for comparing the audio sample, with stored sound models to thereby indicate whether or not the audio sample comprises components that match stored sound models for human speech. Pattern analysis may be applied to compare the audio sample waveform patterns to the stored sound models to determine a degree of matching of the captured audio sample to the stored sound models. Similarly, feature comparisons may be used to determine a degree of matching between features of the captured audio samples with stored sound models. In this way, the identification or classification of sounds in a captured audio sample may be generated with regard to stored sound models that have a highest degree of matching or confidence in the matching.

Assuming a captured audio sample (or audio data) comprises a sound pattern indicative of a speech component, a more cognitive and detailed analysis of the audio sample is performed, along with attention indicator analysis of non-verbal indicators, by the smart speaker system 120. That is, in response to determining that the captured audio sample comprises human speech, the audio sample is provided as data to the smart speaker system 120 which processes the audio sample via the logic of the services 122-129 to determine whether to respond to the human speech and what the response should be. In particular, the speech to text transcription service 124 may operate to perform natural language processing of spoken words in the audio sample by converting the spoken words represented in the captured audio sample data to a textual representation and performing natural language processing on the textual representation. The natural language processing may operate to attempt to determine what is being said to determine how to respond to the spoken words as well as identify any wake words/phrases that may be present in the spoken words, if any. Such natural language processing is generally known in the art.

It should be noted that wake words/phrases are not required by the mechanisms of the illustrative embodiments, but may be further evidence of the attention of the speaker being directed to the smart speaker device 140. These wake words/phrases do not need to be fixed or predefined in a static manner. For example, a collection of potential words/phrases that are indicative of attention being directed to the smart speaker may be stored and identified in portions of natural language text of the speech, e.g., certain words/phrases at the beginning of a statement or question. Thus, for example, words such as, "hey speaker", "hey device", or any other words/phrases indicative of attention being directed to the smart speaker device 140 may be utilized. For example, in some illustrative embodiments, the smart speaker device 140, when configured for deployment in the monitored environment 150, may be trained to recognize a particular name or phrase that indicates that the smart speaker is being spoken to, e.g., the smart speaker device may be given a name, e.g., "Orpheus", or any other user selected name, and the wake phrase may be "Hey, Orpheus . . . "

Whether or not a wake word/phrase is present in the text of the speech in the audio sample, the speech may still be directed to the smart speaker device 140, or may not be directed to the smart speaker device 140, e.g., even though the wake word/phrase is detected as being in the text, either correctly or incorrectly, the speaker may not actually be speaking to the smart speaker device 140, cognitive analysis of non-verbal attention indicators is performed to determine whether the smart speaker device 140 should respond to the detected speech. This cognitive analysis of the non-verbal attention indicators is performed by the attention indicator analysis service 128 which identifies the attention indicator characteristic information from obtained sensor data, and the fusion sensor service 129 which evaluates the various attention indicators and their characteristic information and determines whether or not the smart speaker device 140 is being addressed by the human speaker and if so, initiates a cognitive analysis of the speech to generate an appropriate response, e.g., by the request processing pipeline 108 of the natural language classification service 126, for example.

As shown in FIG. 1A, one or more sensor devices 146, 148 may be deployed within the monitored environment 150 for capturing various types of sensor data representing occurrences within the monitored environment 150. For example, sensor device 146 represents a video or image capture device, such as a video camera or the like, which captures video or images of the monitored environment which may be analyzed and correlated with audio sample data to determine the state of the monitored environment at the time that the audio sample was captured by the audio capture device(s) 142 of the smart speaker device 140. The sensor 148 is a proximity sensor that determines the proximity of objects to the smart speaker device 140 so as to determine the relative positioning of objects, e.g., a speaker of the speech within the captured audio sample, within the monitored environment 150 at the time of the capturing of the audio sample. It should be appreciated that these are only examples of some types of sensors that capture non-verbal sensor data that may be indicative of attention being directed to the smart speaker device 140 and other types of sensors may also be utilized, either in addition to, or in replacement of, one or more of these types of sensors.

In some cases, the proximity sensor 148 may be replaced by, or augmented by, location detection services that operate on the captured audio sample to determine the location of a human speaker relative to the smart speaker device 140 at the time that the audio sample is captured. For example, the audio capture device(s) 142 of the smart speaker device(s) 140 may be able to triangulate or otherwise identify the location within the monitored environment 150 from which the sound is sampled and may track movement of sound sources within the monitored environment, e.g., tracking amplitude and timing of received audio data from one or more audio capture devices indicating movement towards or away from the respective audio capture devices. Such location and/or movement detection may be based on sound amplitudes received at various audio capture devices positioned in different positions of the monitored environment, e.g., the same sound received at different audio capture devices with different amplitudes indicates the source being closer to audio capture devices where the amplitude is relatively greater and further away from audio capture devices with the amplitude is relatively lower.

The location and/or movement information may be used to assist with cognitive analysis of the audio data to identify the source of the speech in the captured audio sample, which may be correlated with sensor data from the other sensor devices 146, 148. That is, knowing a relative location of the smart speaker device 140 to other portions of the monitored environment 150, the smart speaker device 140 may identify portions of the monitored environment 150 from which sounds are being detected and the potential sources of such sounds in those locations to thereby identify portions of the captured video images from the sensor 146 that correspond to those sounds sources, and the objects detected by the proximity detector 148 which correspond to those sound sources.

The captured sensor data from the sensors 146, 148 may be provided to the smart speaker system 120 along with the corresponding captured audio sample data. Assuming that the captured audio sample data is analyzed and determined to contain a speech component as discussed above, the attention indicator analysis service 128 processes audio characteristics of the captured audio sample as well as the sensor data from sensors 146, 148 to determine various non-verbal attention indicators and their characteristics. For example, the captured audio sample data may be analyzed to identify sound energy levels of the speech component of the audio sample relative to other audio components of the audio sample, where the sound energy level may be measured by sensors in terms of decibels (which is the root mean square of the amplitude, for example.

If the speech component has the same sound energy level as other sound components in the audio sample, it is more indicative that the speech is not directed to the smart speaker device 140 as the human speaker is not specifically directing their speech in the direction of the audio capture device 142 of the smart speaker device 140. If the speech component is relatively higher in sound energy than other sound components, this is more indicative of the speech being directed to the smart speaker device 140. Of course, threshold levels may be defined for defining when the sound energy level is sufficiently high to indicate that the speech is being directed to the smart speaker device 140.

As another example, the image and video data from the sensor(s) 146 may be analyzed to identify gaze detection information (eye contact), head nod or other gesture detection indicative of the direction of attention towards the smart speaker device 140. The particular gaze detection and other video or image analysis may be directed to portions of images/video that correlate with the source of the speech component of the captured audio sample. As noted above, this may be done via correlation mechanisms that correlate a determined source location within the monitored environment 150 with elements of the image/video. The correlation may include tracking the eye position of a source of the captured audio sample and movement over several frames in the image/video data. This may include performing image recognition for facial recognition with checking of the eye location and determining the angle of the eye to understand that the eyes are looking to the camera or computer (a range of angle), when the camera or computer is part of the smart speaker device, for example. Facial recognition is not needed initially, but it may assist to lower the computation to find the eyes initially. After face recognition, eye position and time looking at the computer or camera may be used to classify the eye movement as part of gaze detected. If the human speaker is looking at the smart speaker device 140 at the time that the audio sample is captured and maintains such eye contact, or gaze, for a predetermined period of time, this is more indicative that the human speaker is directing the speech towards the smart speaker device 140; otherwise, is it more likely that the human speaker is not directing the speech towards the smart speaker device 140.

In yet another example, the proximity sensor 148 may provide data as to the proximity of other objects within the monitored environment 150 to the smart speaker device 140, including the source of the speech component of the captured audio sample. If the human speaker is within a certain predetermined distance or proximity of the smart speaker device, then this is more indicative of that the human speaker is directing the speech towards the smart speaker device 140. If the human speaker is outside this predetermined distance or proximity, then it is more likely that the human speaker is not directing their speech towards the smart speaker device 140.

Other non-verbal attention indicators or cues may also be evaluated that may be obtained from the level of certainty of the operation of other components of the smart speaker system 120. For example, speech to text transcription confidence (how clearly the smart speaker device heard the statement/question) may be evaluated based on the results of the operation of the speech to text transcription service. A higher confidence in the speech to text transcription indicates a more clearly understood speech detected by the smart speaker device 140 which is indicative that the speech was directed to the smart speaker device 140, whereas lower confidence indicates a lower likelihood that the speech was directed to the smart speaker device 140. Again, thresholds may be established for determining when the confidence is sufficiently high or too low.

Similarly, intent classification confidence, which is an indication that the natural language classification service correctly classified the natural language content of the speech assuming that such natural language classification is performed prior to fusion sensor service 129 operations, may be used as a basis of evidence as to whether the speech component of the captured audio sample is directed to the smart speaker device 140. A low intent classification confidence means that there is not a strongly identifiable intent in the speaker's utterance and likely means that the speaker is not speaking to the smart speaker device.

These various attention indicators or cues, and their characteristics or features, such as values and the like, may be identified through the analysis performed by the attention indicator analysis service 128 which then outputs the results of such analysis to the fusion sensor service 129 as inputs to a deep learning artificial intelligence mechanism, such as a neural network, cognitive processing pipeline, or the like. In one illustrative embodiment, the fusion sensor service 129 uses deep learning for sensor fusion to consolidate important features of the attention indicators or cues, from the variety of different sensor mechanisms 142, 146, 148, to perform conversational awareness determinations. The deep learning, in one illustrative embodiment, may be achieved using a feed-forward, fully-connected neural network that allows for a single consolidated decision as to whether the smart speaker device 140 should respond to the speech present in the captured audio sample or not. Each relevant feature of the attention indicators, e.g., the normalized sound energy level, gaze detection stability, normalized person proximity, speech to text translation confidence, intent classification confidence, and the like, is fed into the neural network as an input to calculate a single output metric corresponding to the likelihood that the system should respond, i.e. a likelihood that the speech component of the captured audio sample is directed to the smart speaker device and thus, the smart speaker device should respond to the speech.

Figure 1B:
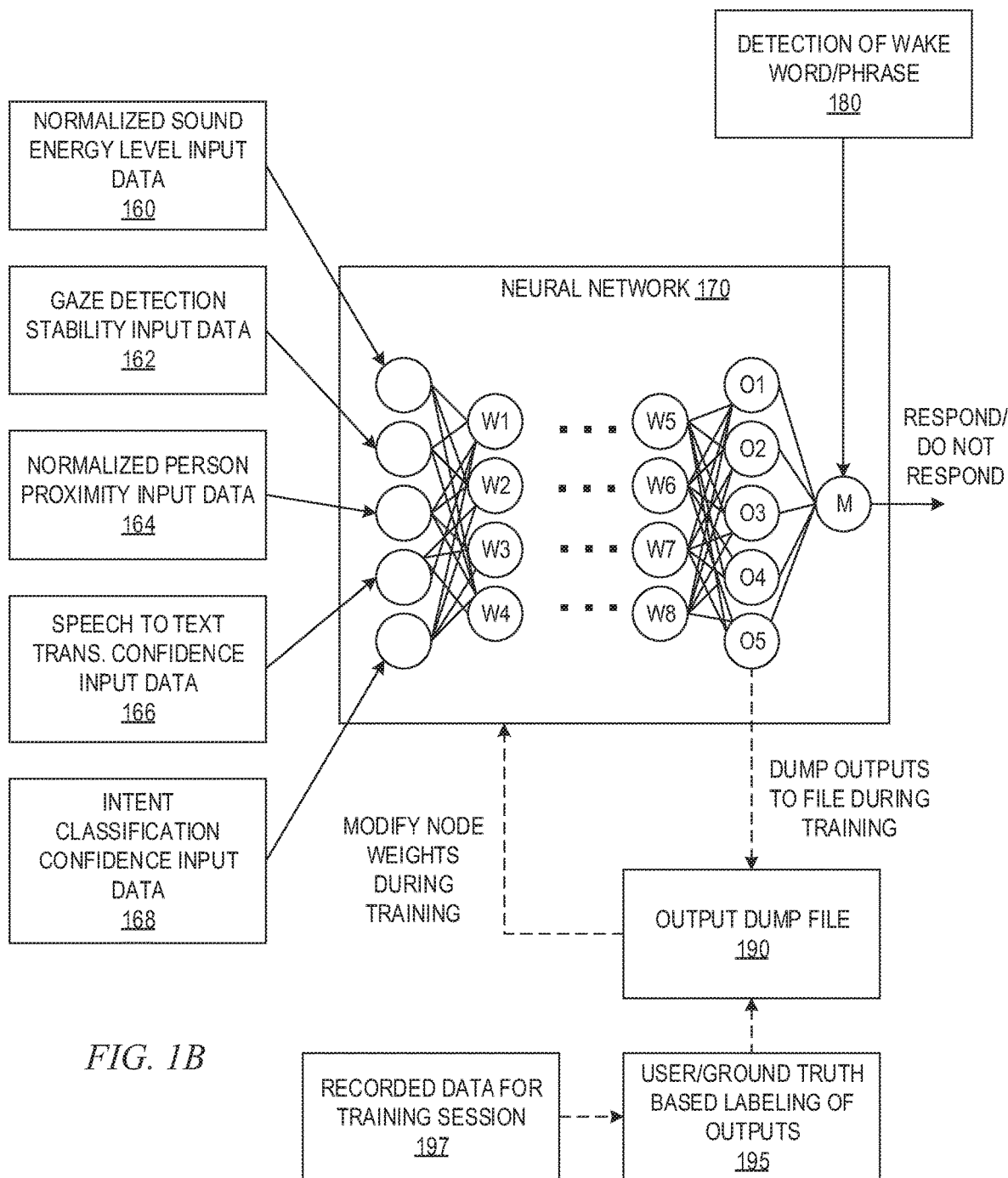
FIG. 1B is an example diagram of a neural network based fusion sensor service in accordance with one illustrative embodiment.

FIG. 1B is an example diagram of a neural network based fusion sensor service in accordance with one illustrative embodiment. As shown in FIG. 1B, various relevant features of non-verbal attention indicators 160-168 are input to the input layer of the neural network 170, which processes these inputs by applying, at the various internal nodes of the layer(s) of the neural network 170, algorithms to generate outputs that indicate whether the node has evaluated the inputs to indicate whether a particular criteria has been satisfied by the inputs. The outputs of the various nodes may be weighted according to assigned weights (W1 . . . WX) that are learned through training of the neural network 170. An output layer of nodes O1 to O5, which may also have associated weights (not shown) generates outputs indicative of whether a corresponding non-verbal attention indicator 160-168 indicates that the speech is directed to the smart speaker device and thus, a corresponding response should be generated by the cognitive system. These outputs may be combined at a merge node M which evaluates the combination of these outputs to generate a single output indicating whether the cognitive system of the smart speaker system should respond to the speech detected in the captured audio sample.

In some illustrative embodiments, this functionality may be combined with the detection of wake words/phrases 180, e.g., the merge node M may take as an additional input data representing whether or not a wake word/phrase was detected in the text of the speech component of the captured audio sample such that all of the indicators along with the presence, or lack thereof, of the wake word/phrase may be considered when determining whether to respond or not to respond to the speech in the captured audio sample. In this way, wake words/phrases 180 may be utilized as additional evidence that the speech is directed to the smart speaker device, but is not dispositive of the determination. That is, sometimes a wake word/phrase may be uttered in other conversations which are not directed to the smart speaker device and the neural network 170 may consider all factors when determining whether the utterance is intended to be directed to the smart speaker device or is part of another conversation, e.g., the wake word may be "Echo" and a speaker may make a statement in the monitored environment "I echo that concern" which is not a statement directed to the smart speaker device. It should be appreciated that the inclusion of element 180 is optional and is not required for operation of the present invention but may be included in some illustrative embodiments.

The neural network model 170 is created by providing a neural network model architecture which is then submitted to training by running the neural network 170 in a training mode using a setting that is similar to the eventual live environment of the system, i.e. a setting similar to that of the monitored environment 150. In this training mode, the neural network 170 operates normally up to the point of attention classification by the output nodes O1 to O5, when instead of merging the outputs to thereby initiate additional functionality of the cognitive system 100, e.g., pipeline 108, and the smart speaker device 140, the neural network 170 outputs all of the output values generated based on the various relevant feature inputs 160-168. This essentially generates an unlabeled sample in the output dump file 190 which is collected, reviewed, and labeled either by a human reviewer or through an automated ground truth based mechanism 195. For example, the labeling of the output dump file may be performed based on an audio or video recording 197 of the training session by a human reviewer who marks the outputs of the output nodes O1 to O5 as to whether the smart speaker system should respond or not based on the evaluation of the corresponding input relevant feature 162-168, i.e. the human reviewer, based on the recording 197 determines whether the neural network 170 generated a correct output at the output nodes O1 to O5. This information is fed back into the neural network so as to train the neural network 170 by modifying weights between nodes such that the neural network 170 generates correct outputs at the output nodes O1 to O5. Once convergence has occurred, i.e. improvements to the operation of the neural network 170 are below a predetermined threshold, then the neural network 170 is trained and ready for deployment for use in processing inputs from the monitored environment 150.

In operation after training, the merge output node M may be utilized to combine the outputs of the output nodes O1 to O5 for the various input relevant features 162-168 to generate a single indication of whether or not the smart speaker device 140 should respond to a speech component of the captured audio sample. In some embodiments, the merge output node M may also be trained in a similar manner to that of the other output nodes O1 to O5 so as to modify any weights, if any, between the various output nodes O1 to O5 associated with the different input relevant features 162-168.

Thus, the illustrative embodiments evaluate one or more of the non-verbal attention indicators or cues to attempt to approximate the ability of a human being to subconsciously interpret signals and their higher order relationships during a conversation, but within a machine implemented mechanism that does not have the innate ability to interpret such indicators or cues. Based on the results of the evaluation of these non-verbal attention indicators, an output as to whether to respond or not is generated. Assuming that the result is that a response should be generated, the fusion sensor service 129 sends an output signal to the cognitive system 100 or request processing pipeline 108 of the cognitive system 100 to perform further analysis and processing of the speech component of the captured audio sample. This may comprise answering a natural language question, performing a responsive action to a natural language request, or the like.

The responsive actions may take many different forms depending on the particular question/request. However, these responsive actions may generally be categorized into local audible/visual message/request output actions, remote communication actions, and local device control actions. Of course, a combination of such actions may also be utilized. These responsive actions may make use of the audio output device(s) 144 of the smart speaker device 140, may make use of control capabilities of the smart speaker device 140 to control other devices within or associated with the monitored environment 150, such as via a wireless network and home automation products, e.g., controllable lights, door locks, appliances, and the like. Examples of local audible/ visual message/request output actions include, but are not limited to, outputting a natural language message in an audible format, outputting a natural language request in an audible format requesting instructions from a user (followed by appropriate action based on the user response), illuminating or otherwise controlling the turning on/off of a visual indicator as well as controlling characteristics of the visual indicator, e.g., color, textual message displayed, blinking, rate of blinking, or other visual characteristics, and the like. Examples of remote communication actions include, but are not limited to, initiating an automated telephone call to a user's registered telephone number, sending an electronic mail message to another computing device, sending an instant message to another computing device, performing actions to place orders with a website, or the like. Examples of local device control actions include, but are not limited to, turning on/off lights, activating/deactivating security alarms, locking/unlocking doors, turning on/off video feeds from security video cameras, controlling the viewing position of such security video cameras, e.g., by controlling a motor in the video camera to pan the camera to focus on a location where the smart speaker system determines the source of a detected sound may be present, playing music or other audio, or the like.

Thus, the illustrative embodiments provide mechanisms for determining, in a cognitive manner, whether to respond to speech in a capture audio sample based on a cognitive determination as to whether the speech is directed to a smart speaker device 140, or other HCI mechanism. The cognitive determination of the attention of the human speaker being directed to the smart speaker may involve the evaluation of a plurality of different verbal and non-verbal attention indicators. As a result, a more accurate determination as to whether a human user is speaking to the smart speaker device 140 is made such that the smart speaker device 140 is able to respond at appropriate times. In addition, the mechanisms of the illustrative embodiments provide functionality to allow the smart speaker device 140 to respond even when a wake word/phrase is not utilized, yet other attention indicators indicate that the human speaker is directing their speech towards the smart speaker device 140.

Figure 2:
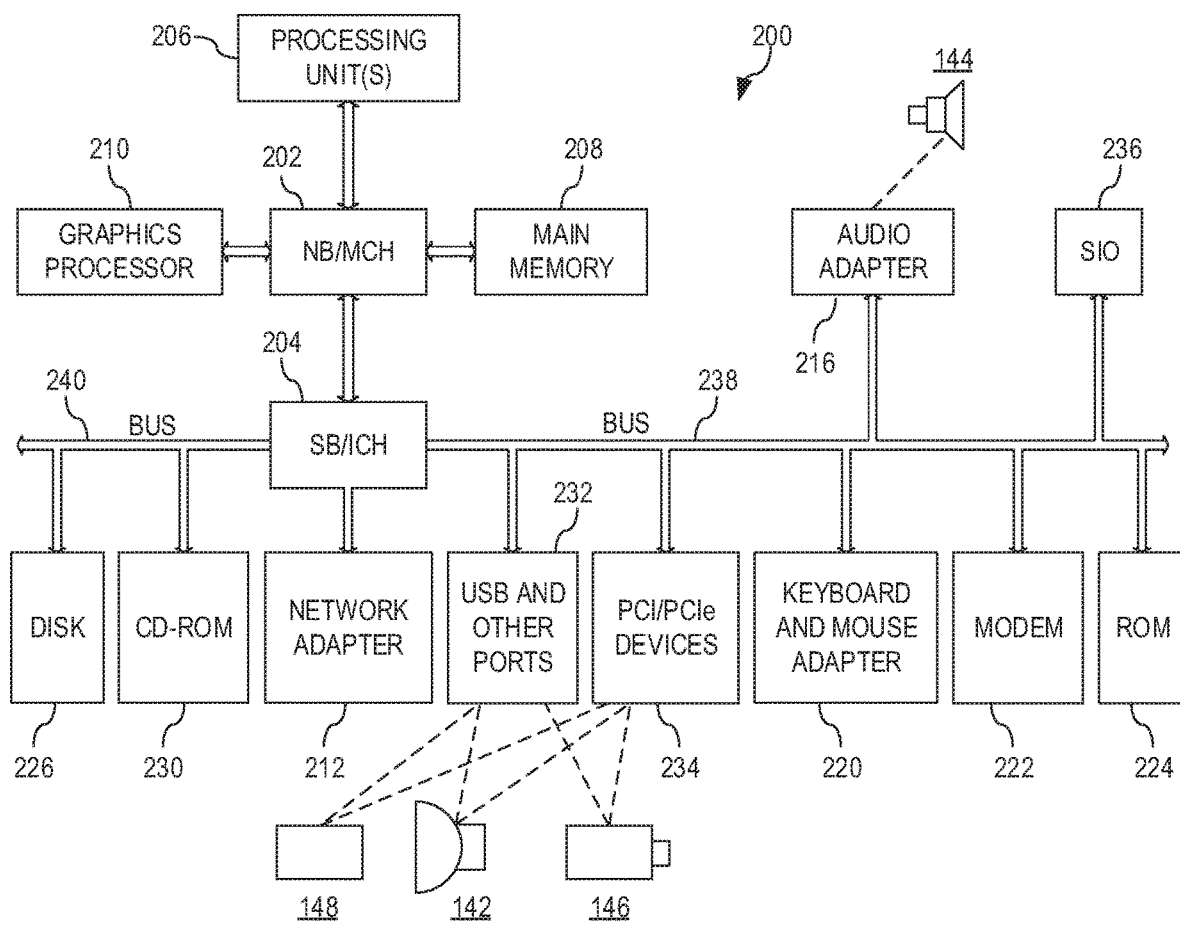
FIG. 2 is an example block diagram of a data processing system in which aspects of the illustrative embodiments may be implemented.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104A or client 110 in FIG. 1A, or even smart speaker device 140, in which computer usable code or instructions implementing the processes for illustrative embodiments of the present invention are located. In one illustrative embodiment, FIG. 2 represents a server computing device, such as a server 104A, which implements a cognitive system 100 and request pipeline 108 augmented to operate with or implement the additional mechanisms of the illustrative embodiments described herein, i.e. the smart speaker system 120, for example.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive) (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

It should be appreciated that, with the mechanisms of the illustrative embodiments, and the data processing system 200 being implemented as a smart speaker device, the various ports 232, and interfaces of the data processing system may couple the data processing system wired or wirelessly with peripheral devices that facilitate the collection of sensor data, image data, audio data, and the like, from a monitored environment, as well as communicate with a smart speaker device or system, and the like. For example, the USB and other ports 232, PCI/PCIe devices 234, and the like, may provide communication interfaces through which the data processing system 200 communicates with one or more audio capture devices 142, cameras 146, proximity sensors 148, or the like, monitoring a monitored environment. Moreover, the audio adapter 216 may provide a communication interface to a speaker 144 or other audio output device. It should be appreciated that the data processing system 200 may alternatively, or in addition, be used to implement as a smart speaker system 120, in which case these captured inputs are not directly received via such interfaces and instead are received from a remotely located smart speaker device 140 and/or sensors present in association with a monitored environment, via the network and corresponding network adapter 212.

Those of ordinary skill in the art will appreciate that the hardware depicted in FIGS. 1A-1B and 2 may vary depending on the implementation. Other internal hardware or peripheral devices, such as flash memory, equivalent non-volatile memory, or optical disk drives and the like, may be used in addition to or in place of the hardware depicted in FIGS. 1A-1B and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
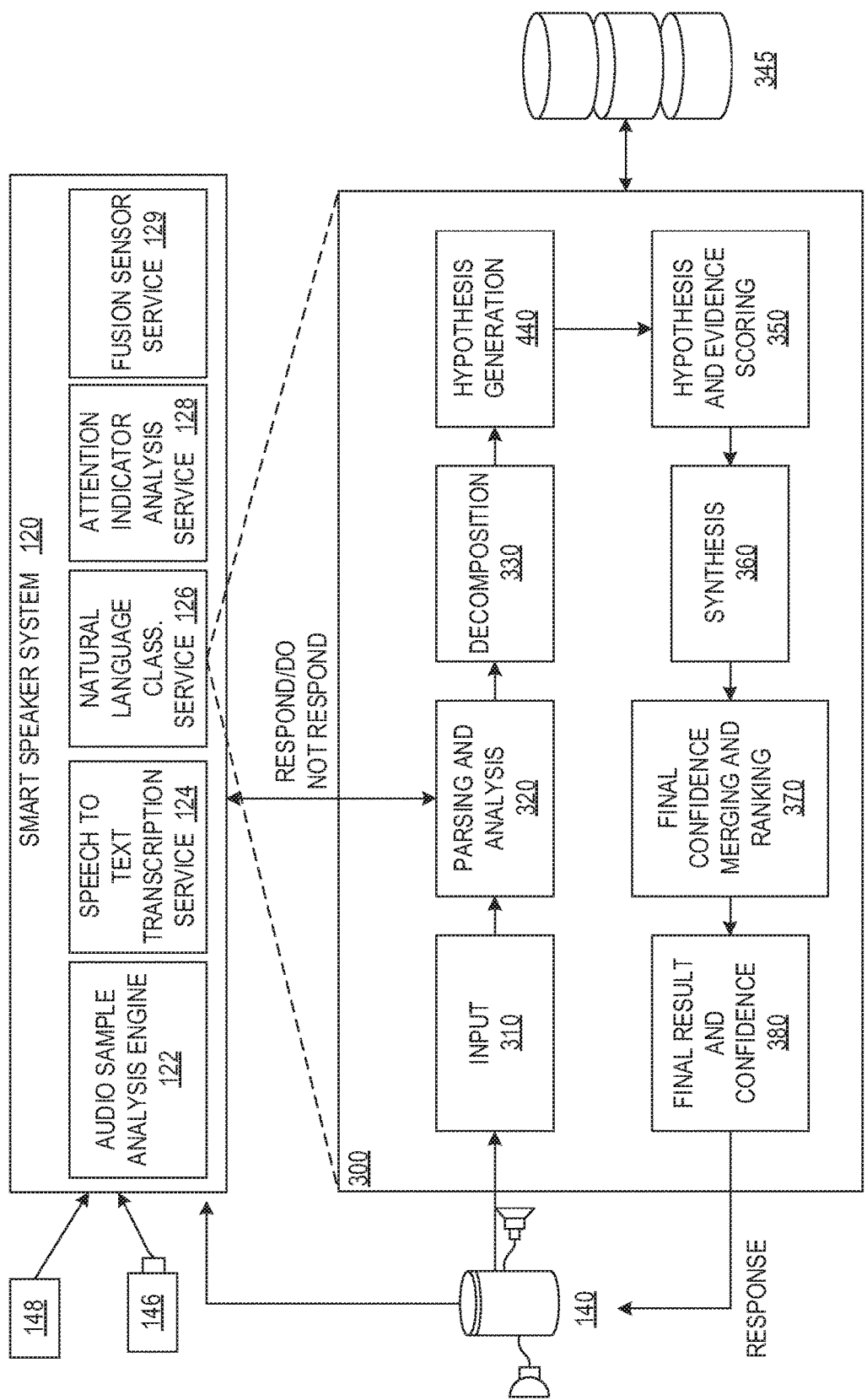
FIG. 3 is an example diagram illustrating the interaction and/or implementation of the smart speaker system with a cognitive system request processing pipeline in accordance with one illustrative embodiment.

FIG. 3 illustrates an example of a cognitive system request processing pipeline used to process an input request or input of captured audio sample data in accordance with one illustrative embodiment. FIG. 3 is provided only as one example of the processing structure that may be implemented to process an input that either explicitly or implicitly requests the operation of a cognitive system to present a response or result to the input request. In particular, with the illustrative embodiments, the request is a speech portion of a captured audio sample that is captured by an audio capture device associated with a smart speaker device or other HCI mechanism.

The request pipeline of FIG. 3 may be implemented, for example, as the request processing pipeline 108 of cognitive system 100 in FIG. 1A. It should be appreciated that the stages of the request processing pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The request processing pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the request processing pipeline 300 comprises a plurality of stages 310-380 through which the cognitive system operates to analyze an input and generate a final response. In an initial input stage 310, the request processing pipeline 300 receives an input request or input data, e.g., an input of captured audio sample data in accordance with the illustrative embodiments, for processing. That is, the smart speaker device captures an audio sample and transmits the audio sample as a data transmission to the cognitive system for analysis. The input data of the captured audio sample is provided to the input stage 310 of the request processing pipeline 300.

In response to receiving the input data, the next stage of the request processing pipeline 300, i.e. the data parsing and analysis stage 320, parses the input data, if necessary converts any detected speech to text, potentially with the assistance of the speech to text transcription service 124, and performs natural language processing (NLP) techniques to extract major natural language features from the text, performs audio characteristic analysis to extract major audio features, and classifies those major features according to types. The natural language processing may utilize natural language classification service 126, for example. The analysis of the audio sample data may take many different forms to extract features representative of particular sounds present in the monitored environment 150 including sound intensity or energy level analysis, location analysis, natural language content analysis to determine the content of the spoken statements or questions, etc.

In addition to providing the capture audio data to the pipeline 300, the captured audio data may be provided to the smart speaker system 120 along with the various other sensor data from sensor devices 146, 148, for processing. The smart speaker system 120 may take these inputs and process them in the manner previously described above with reference to FIGS. 1A and 1B, to generate an output indicating whether or not the smart speaker device 140 that captured the audio sample should respond to any speech component present in the audio sample. This respond/do not response output may be sent back to the pipeline 300, such as in stage 320, to indicate whether or not the pipeline 300 should continue processing the natural language content of the text corresponding to the speech component of the captured audio sample to generate a response. If the respond/do not respond output indicates that the smart speaker device 140 should respond, i.e. the speech in the captured audio sample was directed to the smart speaker device 140, then further processing through stages 330-380 may be performed. If the respond/do not respond output indicates that the smart speaker device 140 should not respond, then further processing through stages 330-380 is discontinued.

Referring again to FIG. 3, the identified major features are then used during the question decomposition stage 330 to decompose the question/request (assumed hereafter to be a natural language question for purposes of description) into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1A. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question, or generating responses to a request. These hypotheses are also referred to herein as "candidate answers" for the input question. For any input question, at this stage 340, there may be hundreds of hypotheses or candidate answers generated that may need to be evaluated.

The Pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the Pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the Pipeline 300 that identifies a manner by which these scores may be combined to generate a confidence score or measure for the individual hypotheses or candidate answers. This confidence score or measure summarizes the level of confidence that the Pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

Figure 4:
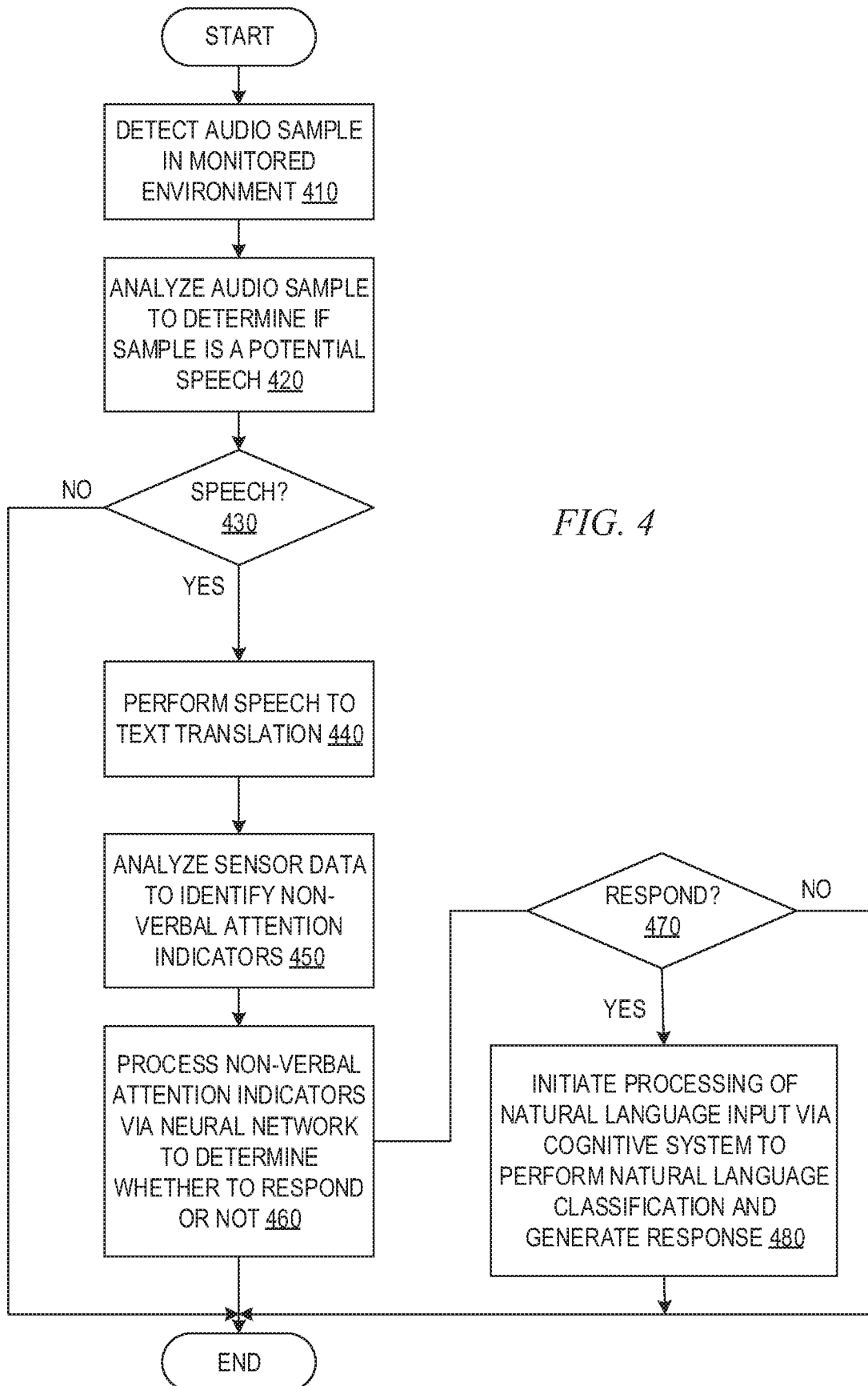
FIG. 4 is a flowchart outlining an example operation of a smart speaker system for processing an audio sample captured by a smart speaker device in accordance with one illustrative embodiment.

FIG. 4 is a flowchart outlining an example operation of a smart speaker system for processing an audio sample captured by a smart speaker device in accordance with one illustrative embodiment. As shown in FIG. 4, the operation starts with the audio capture device(s) associated with the smart speaker device detecting or capturing an audio sample from sounds occurring within or associated with the monitored environment (step 410). It is important to note that these sounds do not require a wake word or phrase to be used to trigger the audio sample capture.

The audio sample is analyzed using an initial set of analysis algorithms to determine if the sample potentially includes speech that needs further detailed analysis (step 420). A determination, based on such analysis, is then made as to whether the audio sample contains a speech component (step 430). If not, then operation terminates.

If the capture audio sample includes a speech component, speech to text translation is performed (step 440). In addition sensor data from various other sensor devices monitoring the monitored environment are also analyzed to identify non-verbal attention indicators (step 450). The non-verbal attention indicators are processed via a neural network or other cognitive or artificial intelligence system, to determine whether or not the speech is directed to the device that detected the audio sample, e.g., the smart speaker device or HCI device, and the device should respond (step 460). A determination is then made as to whether or not the device should respond to the speech in the captured audio sample (step 470). If the determination is that the device should not respond, then the operation terminates. If the determination is that the device should respond, then processing of natural language input of the speech component is initiated, where this processing may be performed by a cognitive system that performs natural language classification and generates an appropriate response to the natural language content (step 480). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a smart speaker system having at least one smart speaker device comprising an audio capture device, and smart speaker system logic for processing audio sample data captured by the audio capture device, the method comprising:

capturing, by the audio capture device of the smart speaker device, an audio sample from a monitored environment;

capturing, by a plurality of sensor devices, sensor data representing a plurality of non-verbal attention indicators having a plurality of different non-verbal attention indicator types and being associated with a source of a speech portion of the audio sample;

evaluating, by the smart speaker system logic, the plurality of non-verbal attention indicators of the sensor data collectively together to determine whether or not the speech portion of the audio sample is directed to the smart speaker device, wherein the evaluation of each non-verbal attention indicator in the plurality of non-verbal attention indicators contributes to the determination; and in response to determining that the speech portion of the audio sample is directed to the smart speaker device, generating, by a cognitive system associated with the smart speaker system, a response to the speech portion, wherein evaluating the plurality of non-verbal attention indicators of the sensor data collectively together to determine whether or not the speech portion of the audio sample is directed to the smart speaker device comprises:

analyzing a sound energy level of the speech portion of the audio sample relative to sound energy level of other portions of the audio sample, wherein in response to the sound energy level of the speech portion being greater than the sound energy level of other portions of the audio sample, the deep learning indicates a higher probability that the speech portion is directed to the smart speaker device;

performing gaze detection on image data obtained by the one or more sensors, wherein in response to determining that the source of the speech portion is gazing in a direction of the smart speaker device for a predetermined period of time, the deep learning indicates a higher probability that the speech portion is directed to the smart speaker device;

performing proximity analysis based on at least one of proximity sensor data or location sensor data indicating a relative location of the source of the speech portion of the audio sample relative to the smart speaker device, wherein, in response to the source of the speech portion being within a threshold distance of the smart speaker device, the deep learning indicates a higher probability that the speech portion is directed to the smart speaker device;

performing a speech to text transcription confidence evaluation based on a transcription of the speech portion into a text representation, wherein in response to the speech to text transcription confidence being equal to or higher than a threshold confidence, the deep learning indicates a higher probability that the speech portion is directed to the smart speaker device; and performing an intent classification confidence evaluation based on natural language classification of the speech portion, wherein in response to the intent classification confidence being equal to or higher than a threshold confidence, the deep learning indicates a higher probability that the speech portion is directed to the smart speaker device.

2. The method of claim 1, wherein generating a response to the speech portion comprises:
converting, by the smart speaker system, the speech portion of the audio sample to a text representation of the speech portion;
performing, by a natural language processing mechanism of the smart speaker system, natural language processing on the text representation of the speech portion to extract features of the speech portion;
determining, based on results of evaluating the non-verbal attention indicators of the sensor data, whether or not the smart speaker system is to respond to the speech portion of the audio sample; and
in response to determining that the smart speaker is to respond to the speech portion of the audio sample, processing, by the cognitive system associated with the smart speaker system, the features of the speech portion to generate the response to the speech portion.

3. The method of claim 1, wherein the one or more sensors comprise at least one of audio sensors, video sensors, or proximity sensors, and wherein the one or more sensors are either integrated into the smart speaker device or distributed separately from the smart speaker device within the monitored environment.

4. The method of claim 1, wherein the one or more sensors comprise a plurality of sensors capturing different types of sensor data, and wherein evaluating, by the smart speaker system logic, the plurality of non-verbal attention indicators of the sensor data collectively together to determine whether or not the speech portion of the audio sample is directed to the smart speaker device comprises:
performing deep learning by the smart speaker system logic on the sensor data captured by the one or more sensors to consolidate features from the sensor data captured by the plurality of sensors of different types to determine whether or not the speech portion is directed to the smart speaker device.

5. The method of claim 4, wherein performing deep learning by the smart speaker system logic comprises, for corresponding ones of the non-verbal attention indicators in the plurality of non-verbal attention indicators, at least one of:
analyzing a sound energy level of the speech portion of the audio sample relative to sound energy level of other portions of the audio sample, wherein in response to the sound energy level of the speech portion being greater than the sound energy level of other portions of the audio sample, the deep learning indicates a higher probability that the speech portion is directed to the smart speaker device;
performing gaze detection on image data obtained by the one or more sensors, wherein in response to determining that the source of the speech portion is gazing in a direction of the smart speaker device for a predetermined period of time, the deep learning indicates a higher probability that the speech portion is directed to the smart speaker device;
performing proximity analysis based on at least one of proximity sensor data or location sensor data indicating a relative location of the source of the speech portion of the audio sample relative to the smart speaker device, wherein, in response to the source of the speech portion being within a threshold distance of the smart speaker device, the deep learning indicates a higher probability that the speech portion is directed to the smart speaker device;
performing a speech to text transcription confidence evaluation based on a transcription of the speech portion into a text representation, wherein in response to the speech to text transcription confidence being equal to or higher than a threshold confidence, the deep learning indicates a higher probability that the speech portion is directed to the smart speaker device; or
performing an intent classification confidence evaluation based on natural language classification of the speech portion, wherein in response to the intent classification confidence being equal to or higher than a threshold confidence, the deep learning indicates a higher probability that the speech portion is directed to the smart speaker device.

6. The method of claim 1, wherein the cognitive system is a question answering system comprising at least one question answering pipeline, and wherein the cognitive system processes features of the speech portion to generate a response at least by:
performing a search of a corpus of electronic documents to generate candidate answers to a natural language question present in the speech portion of the audio sample, and
selecting a candidate answer to be a final answer that is output to the source of the speech portion via the smart speaker device.

7. The method of claim 1, further comprising:
processing the captured audio sample, by the smart speaker device, to determine whether or not the captured audio sample comprises the speech portion, wherein the capturing, evaluating, and generating operations are performed in response to the smart speaker device determining that the captured audio sample comprises the speech portion.

8. The method of claim 1, wherein evaluating the plurality of non-verbal attention indicators of the sensor data comprises inputting, to a neural network of the smart speaker system logic, the plurality of non-verbal attention indicators, wherein the neural network collectively processes the plurality of non-verbal attention indicators to generate an output indicating whether or not the speech portion of the audio sample is directed to the smart speaker device.

9. The method of claim 8, wherein:
the neural network comprises a layer of output nodes having a separate output node for each non-verbal attention indicator in the plurality of non-verbal attention indicators that are input to the neural network,
the output nodes generate outputs indicative of whether a corresponding non-verbal attention indicator indicates that the speech portion is directed to the smart speaker device, and
the outputs from the output nodes are combined by a merge node of the neural network to generate a single output indicating whether or not the speech portion of the audio sample is directed to the smart speaker device.

10. A computer program product comprising a non-transitory computer readable medium having a computer readable program stored therein, wherein the computer readable program, when executed on a data processing system, causes the data processing system to:
capture, by an audio capture device associated with a smart speaker device, an audio sample from a monitored environment;

capture, by a plurality of sensor devices, sensor data representing a plurality of non-verbal attention indicators having a plurality of different non-verbal attention indicator types and being associated with a source of a speech portion of the audio sample;

evaluate the plurality of non-verbal attention indicators of the sensor data collectively together to determine whether or not the speech portion of the audio sample is directed to the smart speaker device, wherein the evaluation of each non-verbal attention indicator in the plurality of non-verbal attention indicators contributes to the determination; and in response to determining that the speech portion of the audio sample is directed to the smart speaker device, generate a response to the speech portion, wherein evaluating the plurality of non-verbal attention indicators of the sensor data collectively together to determine whether or not the speech portion of the audio sample is directed to the smart speaker device comprises:

analyzing a sound energy level of the speech portion of the audio sample relative to sound energy level of other portions of the audio sample, wherein in response to the sound energy level of the speech portion being greater than the sound energy level of other portions of the audio sample, the deep learning indicates a higher probability that the speech portion is directed to the smart speaker device;

performing gaze detection on image data obtained by the one or more sensors, wherein in response to determining that the source of the speech portion is gazing in a direction of the smart speaker device for a predetermined period of time, the deep learning indicates a higher probability that the speech portion is directed to the smart speaker device;

performing proximity analysis based on at least one of proximity sensor data or location sensor data indicating a relative location of the source of the speech portion of the audio sample relative to the smart speaker device, wherein, in response to the source of the speech portion being within a threshold distance of the smart speaker device, the deep learning indicates a higher probability that the speech portion is directed to the smart speaker device;

performing a speech to text transcription confidence evaluation based on a transcription of the speech portion into a text representation, wherein in response to the speech to text transcription confidence being equal to or higher than a threshold confidence, the deep learning indicates a higher probability that the speech portion is directed to the smart speaker device; and performing an intent classification confidence evaluation based on natural language classification of the speech portion, wherein in response to the intent classification confidence being equal to or higher than a threshold confidence, the deep learning indicates a higher probability that the speech portion is directed to the smart speaker device.

11. The computer program product of claim 10, wherein the data processing system generates a response to the speech portion at least by:

converting the speech portion of the audio sample to a text representation of the speech portion;

performing, by a natural language processing mechanism, natural language processing on the text representation of the speech portion to extract features of the speech portion;

determining, based on results of evaluating the non-verbal attention indicators of the sensor data, whether or not to respond to the speech portion of the audio sample; and in response to determining to respond to the speech portion of the audio sample, processing, by a cognitive system associated with the data processing system, the features of the speech portion to generate the response to the speech portion.

12. The computer program product of claim 10, wherein the one or more sensors comprise at least one of audio sensors, video sensors, or proximity sensors, and wherein the one or more sensors are either integrated into the smart speaker device or distributed within the monitored environment.

13. The computer program product of claim 10, wherein the one or more sensors comprise a plurality of sensors capturing different types of sensor data, and wherein the data processing system evaluates the plurality of non-verbal attention indicators of the sensor data collectively together to determine whether or not the speech portion of the audio sample is directed to the smart speaker device at least by:

performing deep learning on the sensor data captured by the one or more sensors to consolidate features from the sensor data captured by the plurality of sensors of different types to determine whether or not the speech portion is directed to the smart speaker device.

14. The computer program product of claim 13, wherein performing deep learning comprises, for corresponding ones of the non-verbal attention indicators in the plurality of non-verbal attention indicators, at least one of:

analyzing a sound energy level of the speech portion of the audio sample relative to sound energy level of other portions of the audio sample, wherein in response to the sound energy level of the speech portion being greater than the sound energy level of other portions of the audio sample, the deep learning indicates a higher probability that the speech portion is directed to the smart speaker device;

performing gaze detection on image data obtained by the one or more sensors, wherein in response to determining that the source of the speech portion is gazing in a direction of the smart speaker device for a predetermined period of time, the deep learning indicates a higher probability that the speech portion is directed to the smart speaker device;

performing proximity analysis based on at least one of proximity sensor data or location sensor data indicating a relative location of the source of the speech portion of the audio sample relative to the smart speaker device, wherein, in response to the source of the speech portion being within a threshold distance of the smart speaker device, the deep learning indicates a higher probability that the speech portion is directed to the smart speaker device;

performing a speech to text transcription confidence evaluation based on a transcription of the speech portion into a text representation, wherein in response to the speech to text transcription confidence being equal to or higher than a threshold confidence, the deep learning indicates a higher probability that the speech portion is directed to the smart speaker device; or performing an intent classification confidence evaluation based on natural language classification of the speech portion, wherein in response to the intent classification confidence being equal to or higher than a threshold confidence, the deep learning indicates a higher probability that the speech portion is directed to the smart speaker device.

15. The computer program product of claim 10, wherein the data processing system comprises a question answering system comprising at least one question answering pipeline, and wherein the data processing system processes features of the speech portion to generate a response at least by performing a search of a corpus of electronic documents to generate candidate answers to a natural language question present in the speech portion of the audio sample, and selecting a candidate answer to be a final answer that is output to the source of the speech portion via the smart speaker device.

16. The computer program product of claim 10, further comprising:

processing the captured audio sample, by the smart speaker device, to determine whether or not the captured audio sample comprises the speech portion, wherein the capturing, evaluating, and generating operations are performed by the data processing system in response to the smart speaker device determining that the captured audio sample comprises the speech portion.

17. An apparatus comprising:

a processor; and a memory coupled to the processor, wherein the memory comprises instructions which, when executed by the processor, cause the processor to:

capture, by an audio capture device associated with a smart speaker device, an audio sample from a monitored environment;

receive, from a plurality of sensor devices, sensor data representing a plurality of non-verbal attention indicators having a plurality of different non-verbal attention indicator types and being associated with a source of a speech portion of the audio sample;

evaluate the plurality of non-verbal attention indicators of the sensor data collectively together to determine whether or not the speech portion of the audio sample is directed to the smart speaker device, wherein the evaluation of each non-verbal attention indicator in the plurality of non-verbal attention indicators contributes to the determination; and in response to determining that the speech portion of the audio sample is directed to the smart speaker device, generate a response to the speech portion, wherein evaluating the plurality of non-verbal attention indicators of the sensor data collectively together to determine whether or not the speech portion of the audio sample is directed to the smart speaker device comprises:

analyzing a sound energy level of the speech portion of the audio sample relative to sound energy level of other portions of the audio sample, wherein in response to the sound energy level of the speech portion being greater than the sound energy level of other portions of the audio sample, the deep learning indicates a higher probability that the speech portion is directed to the smart speaker device;

performing gaze detection on image data obtained by the one or more sensors, wherein in response to determining that the source of the speech portion is gazing in a direction of the smart speaker device for a predetermined period of time, the deep learning indicates a higher probability that the speech portion is directed to the smart speaker device;

performing proximity analysis based on at least one of proximity sensor data or location sensor data indicating a relative location of the source of the speech portion of the audio sample relative to the smart speaker device, wherein, in response to the source of the speech portion being within a threshold distance of the smart speaker device, the deep learning indicates a higher probability that the speech portion is directed to the smart speaker device;

performing a speech to text transcription confidence evaluation based on a transcription of the speech portion into a text representation, wherein in response to the speech to text transcription confidence being equal to or higher than a threshold confidence, the deep learning indicates a higher probability that the speech portion is directed to the smart speaker device; and performing an intent classification confidence evaluation based on natural language classification of the speech portion, wherein in response to the intent classification confidence being equal to or higher than a threshold confidence, the deep learning indicates a higher probability that the speech portion is directed to the smart speaker device.

* * * * *